United States Patent [19]

Ciba et al.

[11] Patent Number: 5,263,580
[45] Date of Patent: Nov. 23, 1993

[54] CASE FOR AN OPTICAL DISK

[75] Inventors: Yukiyoshi Ciba; Tomoyoshi Arai, both of Saitama, Japan

[73] Assignees: Pioneer Electronic Corporation, Tokyo; Pioneer Precision Machinery Corp., Saitama; Pioneer LDC, Inc., Tokyo, all of Japan

[21] Appl. No.: 904,076

[22] Filed: Jun. 25, 1992

[30] Foreign Application Priority Data

Sep. 20, 1991 [JP] Japan ................................ 3-84845[U]

[51] Int. Cl.$^5$ ............................................. B65D 85/57
[52] U.S. Cl. ..................................... 206/309; 206/310; 206/444
[58] Field of Search ............... 206/303, 309, 312, 313, 206/444, 310; 312/9.57, 9.63

[56] References Cited

U.S. PATENT DOCUMENTS 4,433,410  2/1984  Siryj et al. .................... 206/312 X

FOREIGN PATENT DOCUMENTS 0199882  8/1989  Japan ......................... 206/309

Primary Examiner—Bryon P. Gehman
Attorney, Agent, or Firm—Nikaido, Marmelstein, Murray & Oram

[57] ABSTRACT

A plurality of supporting members are provided on a base plate of a case body. A peripheral portion of an optical disk is mounted on the supporting members. A spring is provided in the case body. A peripheral edge of the disk is engaged with the spring so that the disk is urged to a pair of supporting members opposite the spring.

1 Claim, 8 Drawing Sheets

CASE FOR AN OPTICAL DISK

BACKGROUND OF THE INVENTION

The present invention relates to a disk case for storing an optical disk such as a video disk therein. The case has a cover to close the case.

FIG. 6 shows a conventional disk case which comprises a body 1 and a cover 2 mounted on the body 1. The body 1 has opposite side frames 1a each having a pivot pin 3 and a lock pin 5. The cover 2 has a front plate 9 and opposite side plates 9a. Provided on the side plate 9a is a hole 4 to be pivotally engaged with the pin 3 and a recess 6 engaged with the lock pin 5. Thus, the cover 2 is pivotally mounted on the case body 1 and fixed to the body 1 when closed by the engagement of the pin 5 with the recess 6.

In the central portion of the body 1, a disk holding member 7 is provided for holding a disk A. The holding member 7 comprises a plurality of elastic lugs 7a disposed with a gap there-between and has a diameter slightly larger than a central hole A1 of the disk A at a lower portion thereof. When the periphery of the hole A1 is engaged with the holding member 7, the elastic lugs 7a are inwardly deformed. Thus, the disk A is held by the holding member 7 with the elasticity of the elastic lugs 7a.

A rib 8 is provided on each side plate 9a of the cover 2 to reinforce the cover and to serve as a stopper if the disk A is moved in the case.

In order to open the cover 2, the front plate 9 is pushed up by the finger so that the recesses 6 are disengaged from the lock pins 5 of the body 1. Then, the cover 2 is rotated in the upper direction about the pins 3.

To remove the disk from the case, a peripheral portion of the disk is raised by a finger of the user and a thumb is engaged with the periphery of the hole A1 so as to pull out the disk from the holding member 7.

In the conventional disk case, since the disk A is firmly fixed to the holding member 7, a large force is required to remove the disk from the holding member, which may cause a deformation of the disk. Furthermore, if the disk is pressed against the wall of the body 1 when removing, a recording surface of the disk may be damaged.

When the disk A is supported on the holding member 7, since the periphery of the disk is positioned apart from the body 1, the periphery of the disk may be vibrated. If the case is dropped, the disk may be damaged.

In order to solve the above mentioned defect, a disk case as shown in FIG. 7 has been developed.

The disk case of FIG. 7 has a body 10 and cover 20 slidably and pivotally mounted on the body 10. The cover 20 has opposite side plates 20a provided with guide pins 21 slidably engaged with guide grooves 11 formed on opposite side plates 10a of the body 10. In order to open the cover 20, the cover 20 is moved in the direction shown by an arrow a, sliding the pins 21 in the grooves 11. When the pins 21 reach the rear ends of grooves, the cover 20 is rotated about the pins 21 in the clockwise direction in FIG. 7. Thus, the cover is opened as shown in FIG. 7. The cover is further rotated to turn it about the pins 21 and the pins 21 are moved in the grooves 11 in the direction of an arrow b, so that the cover 20 becomes an upward position and is engaged with the underside of the body 10.

The body 10 is provided with a gourd-shaped holding member 13 to be engaged with the periphery of the hole A1 of the disk A for holding and positioning the disk, and a plurality of stoppers 14 for supporting the periphery of the disk A. The stopper 14 has a step portion 14a secured to the body on which the periphery of the disk A is mounted, a stopper portion 14b for preventing the disk A from moving in the horizontal direction, and a rib 14c for the stopper portion 14b. A pair of lugs 23 are provided on the inner portion of the side plate 20a of the cover 20 to be slidably engaged with upper portions of the side plate 10a of the body 10 when the cover is closed. Thus, the disk A is prevented from moving in the vertical direction in the case.

In the body 10, a lock member 16 and a pair of hooks 15 provided corresponding to the lock member are provided.

FIG. 8 shows the lock member 16 which comprises a pair of frames 17 secured to the body 10, and a lock plate 18 slidably mounted in the frames 17. The lock plate 18 has a pair of projections 18b provided on opposite sides thereof, and a lock end 18a engaged with a part of the periphery of the disk A for locking the disk. Each of the frames 17 has a pair of engaging recesses 17a and 17b selectively engaged with the projection 18b of the lock plate 18.

When the disk A is mounted in the case on the holding member 13 and the stopper portions 14a of the stoppers 14, the lock plate 18 is slid in the frames 17 to engage the projections 18b with the recesses 17b so that the lock end 18a engages with the periphery of the disk. On the other hand, the periphery of the disk opposite to the lock member 16 is engaged with the hooks 15. Thus, it is impossible to remove the disk A from the body 1.

When the lock plate 18 is outwardly slid in the frames 17 and the projections 18b are engaged with recesses 17a, the lock end 18a is disengaged from the disk A. The disk A is easily disengaged from the hooks 15, and released from the holding member 13 and the stoppers 14.

In the disk case, the cover 20 is easily operated and the disk A is safely and exactly mounted in or removed from the case. When the cover 20 is opened, since the cover is positioned on the underside of the body 10, the disk can be removed from the case by one hand, while the case is supported by the other hand in a stable state.

However, since a large number of parts is provided in the case, the construction is complicated, thereby increasing the manufacturing cost.

SUMMARY OF THE INVENTION

An object of the present invention is to provide a disk case where a disk is exactly mounted in the case with a simple construction.

According to the present invention, there is provided a case for an optical disk having a case body having a base plate, side plates and a front plate, and a cover, comprising a plurality of supporting members provided on the base plate, wherein a peripheral portion of the optical disk is mounted on the supporting members with a gap between the optical disk and the base plate, and a spring provided in the case body for engaging a peripheral edge of the disk to urge the disk at least to supporting members opposite the spring.

In one aspect of the invention, each of the supporting members has a support portion for supporting the disk and a bevel on which the disk is urged by the spring. A pair of resilient lugs is provided on the cover. Each lug has a ball-shaped projection which is provided to be abutted on the peripheral portion of the optical disk to urge the disk to the supporting members when the cover is closed.

The other objects and features of this invention will become understood from the following description with reference to the accompanying drawings.

DETAILED DESCRIPTION OF THE PREFERRED EMBODIMENT

Figure 1:
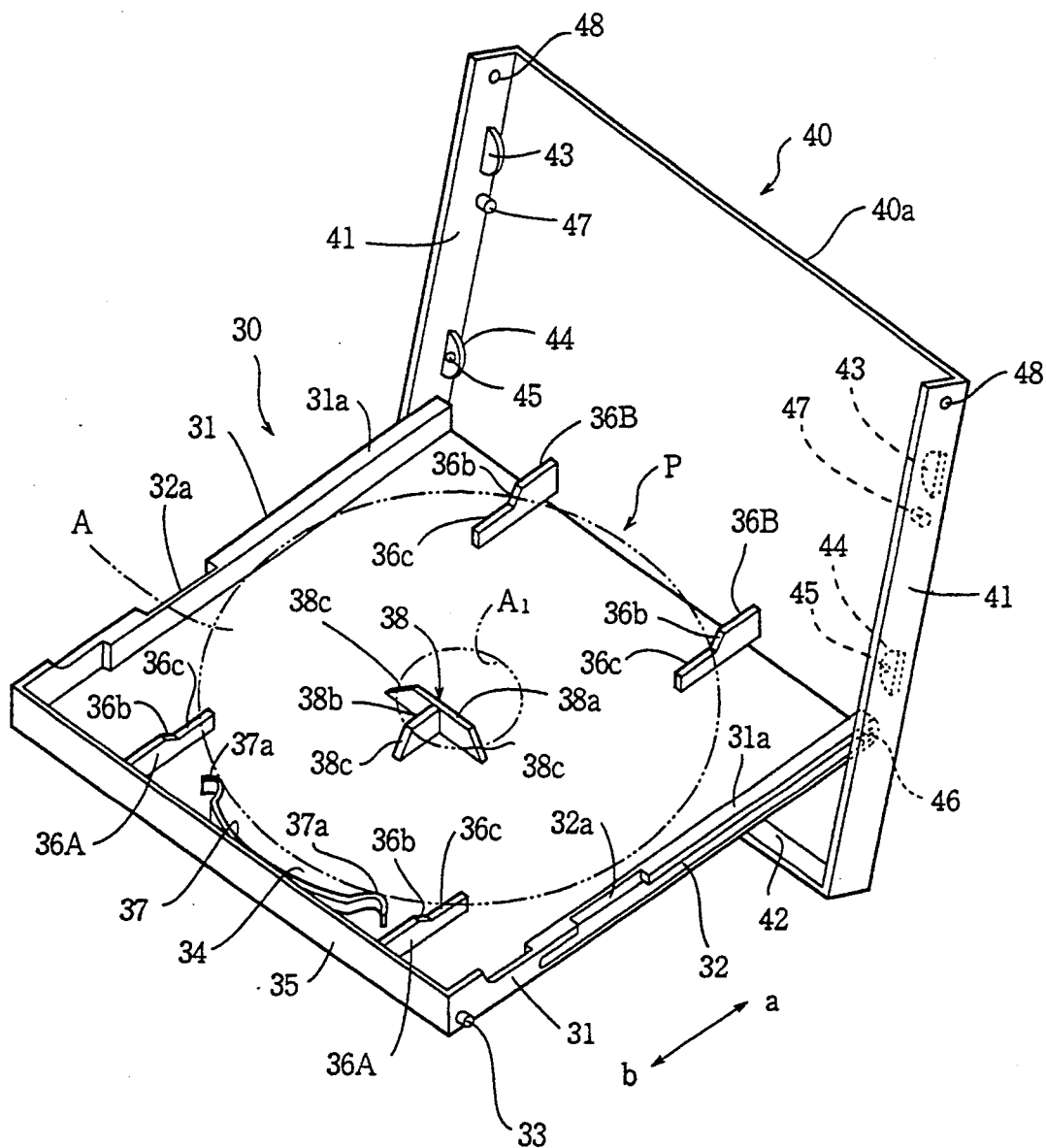
FIG. 1 is a perspective view showing a disk case according to the present invention.

Referring to FIG. 1, a disk case of the present invention has a case body 30 and a cover 40 slidably and rotatably mounted on the case body 30. The case body 30 and the cover 40 are formed by injection molding, respectively, and preferably made of transparent synthetic resin so as to allow a user to read a label on the disk A through the case.

The case body 30 comprises a base plate 34, opposite side plates 31, and a front plate 35. A large portion of each side plate 31 is reduced in height, and the lowered portion has a large thickness. The side plate 31 has a guide groove 32 formed on the outer portion thereof, extending through the large thickness portion, and an engaging pin 33 provided near the front plate 35. The guide groove 32 has a notch 32a formed in an upper portion 31a of the side plate 31.

Provided on the base plate 34 is a pair of front supporting members 36A secured thereto and disposed parallel with the side plates 31, and a pair of rear supporting members 36B provided corresponding to the front supporting members 36A. Each supporting member has a bevel 36b, and a flat support portion 36c on which the periphery of the disk A is mounted with a gap between the disk and the base plate 34. A spring plate 37 having curved resilient ends 37a is secured to the inner portion of the front plate 35 between the front supporting members 36A.

A positioning member 38 is provided on the base plate 34 at the center thereof. The positioning member 38 has a T-shape in plan view and comprises a long strip 38a and a short strip 38b secured to the long strip 38a. Both ends and an end of the strips 38a and 38b are beveled to form beveled portions 38c. The periphery of the hole A1 of the disk A is adapted to be mounted on the beveled portions 38c in the middle thereof. Thus, the disk A is mounted in the case, disposed apart from the base plate 34.

The cover 40 comprises a cover plate 40a, opposite side plates 41, and a rear plate 42. The side plate 41 is provided with a pair of resilient lugs 43 and 44 provided on the inner portion thereof to be engaged with the upper portion 31a of the side plate 31 of the case body 30, a pivotal pin 46 slidably engaged with the guide groove 32 of the side plate 31, a pin 47 for restricting the rotation of the cover 40, and a hole 48 to be engaged with the engaging pin 33 of the side plate 31. The resilient lug 44 has a ball-shaped projection 45 to be engaged with the periphery of the disk A.

The operation of the disk case will be described with reference to FIGS. 2 to 5.

Figure 2:
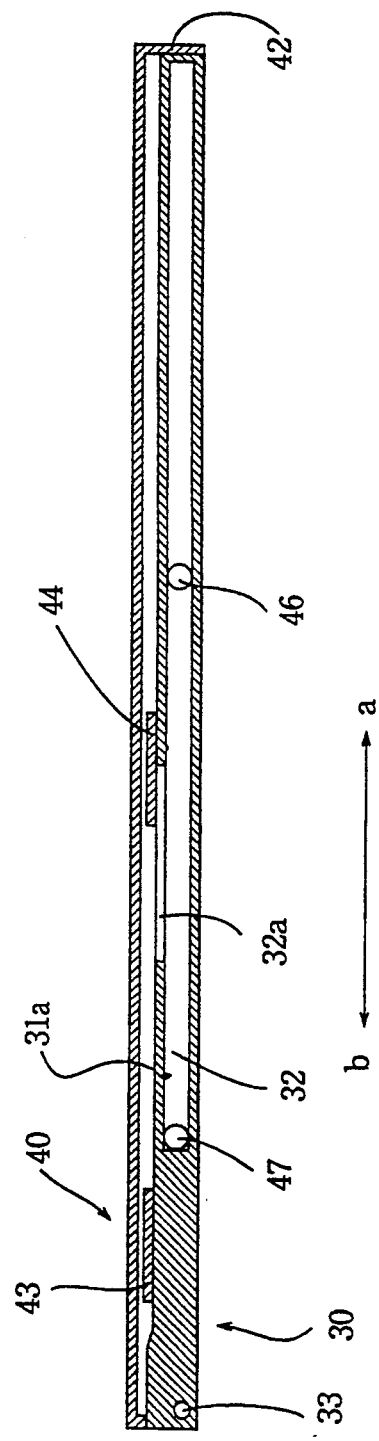
FIG. 2 is a sectional view of the case where a cover of the case is closed.

Referring to FIG. 2 showing the case in the closing state, the pivotal pin 46 and the pin 47 of the cover 40 are engaged with the guide groove 32 of the case body 30, while the engaging pin 33 of the case body is inserted into the hole 48 of the cover.

Figure 3:
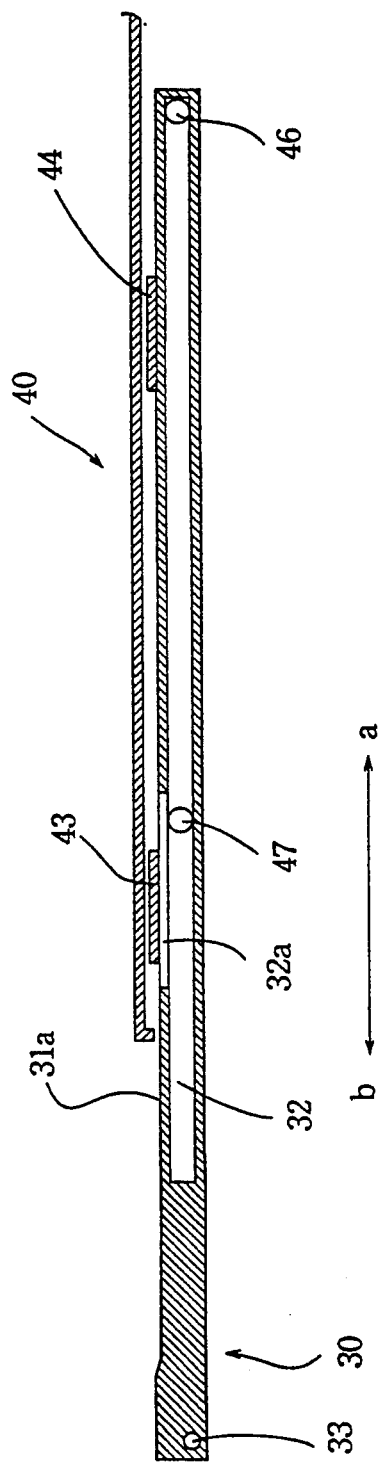
FIG. 3 is a sectional view of the case where the cover is slid in a body of the case.
Figure 4:
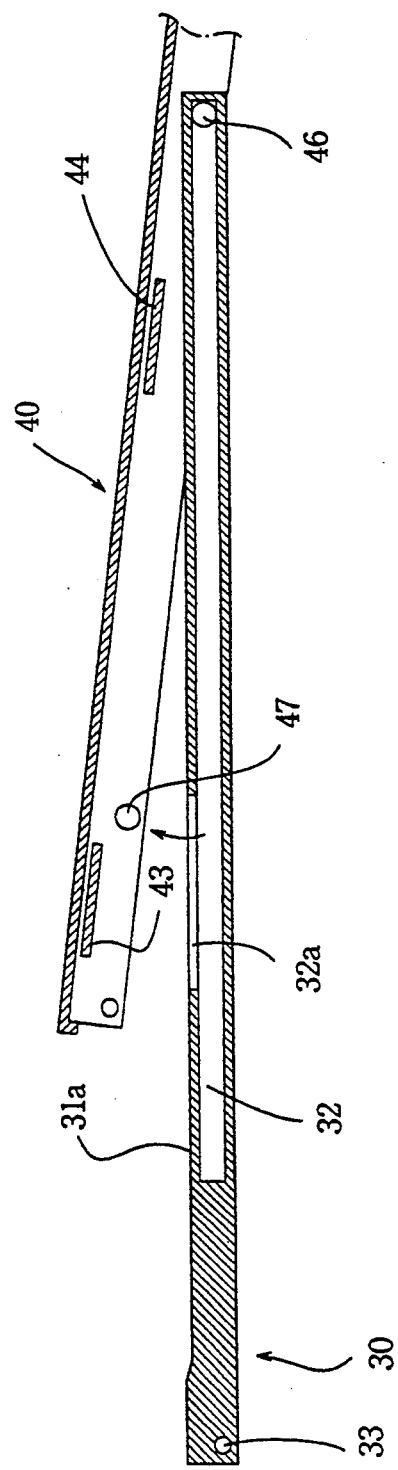
FIG. 4 is a sectional view of the case where the cover is rotated about the body.

In order to open the cover 40, the cover 40 is moved in the direction shown by the arrow a. The hole 48 is disengaged from the pin 33 to release the cover 40 from the case body 30. Since the lugs 43 and 44 slide on the upper portion 31a of the side plate 31, the cover is moved, maintaining the horizontal position. When the pivotal pin 46 abuts on the rear end of the guide groove 32, the cover stops. The pin 47 is located in the guide groove 32 at the notch 32a as shown in FIG. 3. In this state, the cover 40 is rotated in the clockwise direction about the pin 46, so that the pin 47 passes through the notch 32a to be disengaged from the groove 32 as shown in FIG. 4. The cover 40 is rotated until the rear plate 42 touches the rear portion of the base plate 34. Thereafter, the cover 40 is moved in the direction of the arrow b, sliding the pin 46 in the groove 32 to the front end thereof. Thus, the cover is engaged with the underside of the body 30.

In order to mount the disk A in the disk case, the periphery of the disk is mounted on the support portions 36c of the front supporting members 36A. The periphery of the disk is further engaged with the resilient ends 37a of the spring plate 37. The disk is slightly pushed in the direction shown by the arrow b against the spring 37 to mount the opposite periphery P on the support portions 36c of the rear supporting members 36B. The disk is urged to the beveled portions 36b of the supporting members 36B by the spring 37. The inside wall of the hole A1 of the disk A is mounted on the positioning member 38. The periphery of the hole A1 is engaged with the beveled portions 38c of the strips 38a and 38b. Thus, the disk is mounted in the case so as to provide a gap between the recording surface thereof and the base plate 34. The clearance of the disk in the horizontal direction is restricted by the spring plate 37.

In order to remove the disk A from the case, the disk is slightly pushed in the direction b at the periphery P against the spring plate 37 so that the disk is easily picked up.

In order to close the case while the disk A is mounted in the case, the cover 40 is operated in the reverse order to the opening thereof. The pins 47 are inserted into the notches 32a and engaged with the guide grooves 32. The cover 40 is pulled to be moved in the direction shown by the arrow b so that the pins 47 and the pivotal pins 46 are moved in the guide grooves 32 while the lugs 43 and 44 are slid on the upper portions 31a of the side plates 31. When the pins 47 abut on the front ends of the guide grooves, the holes 48 of the cover are engaged with the engaging pins 33. Thus, the cover 40 is fixed to the case body 30.

Figure 5:
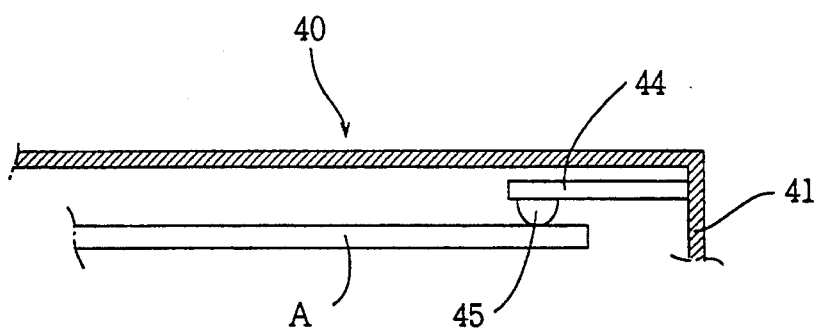
FIG. 5 is an enlarged sectional view showing a part of the case.
Figure 6:
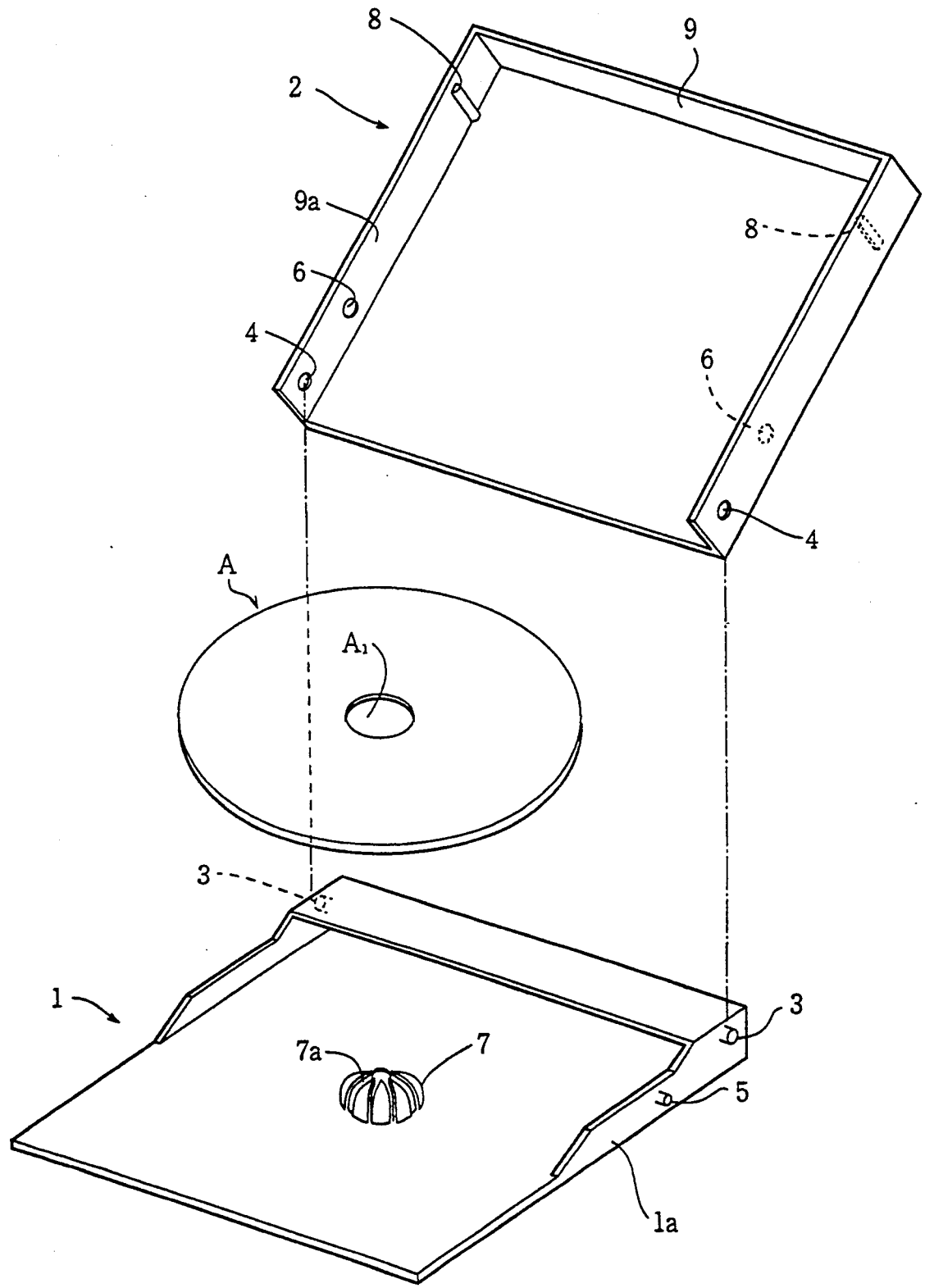
FIG. 6 is an exploded perspective view showing a conventional disk case.
Figure 7:
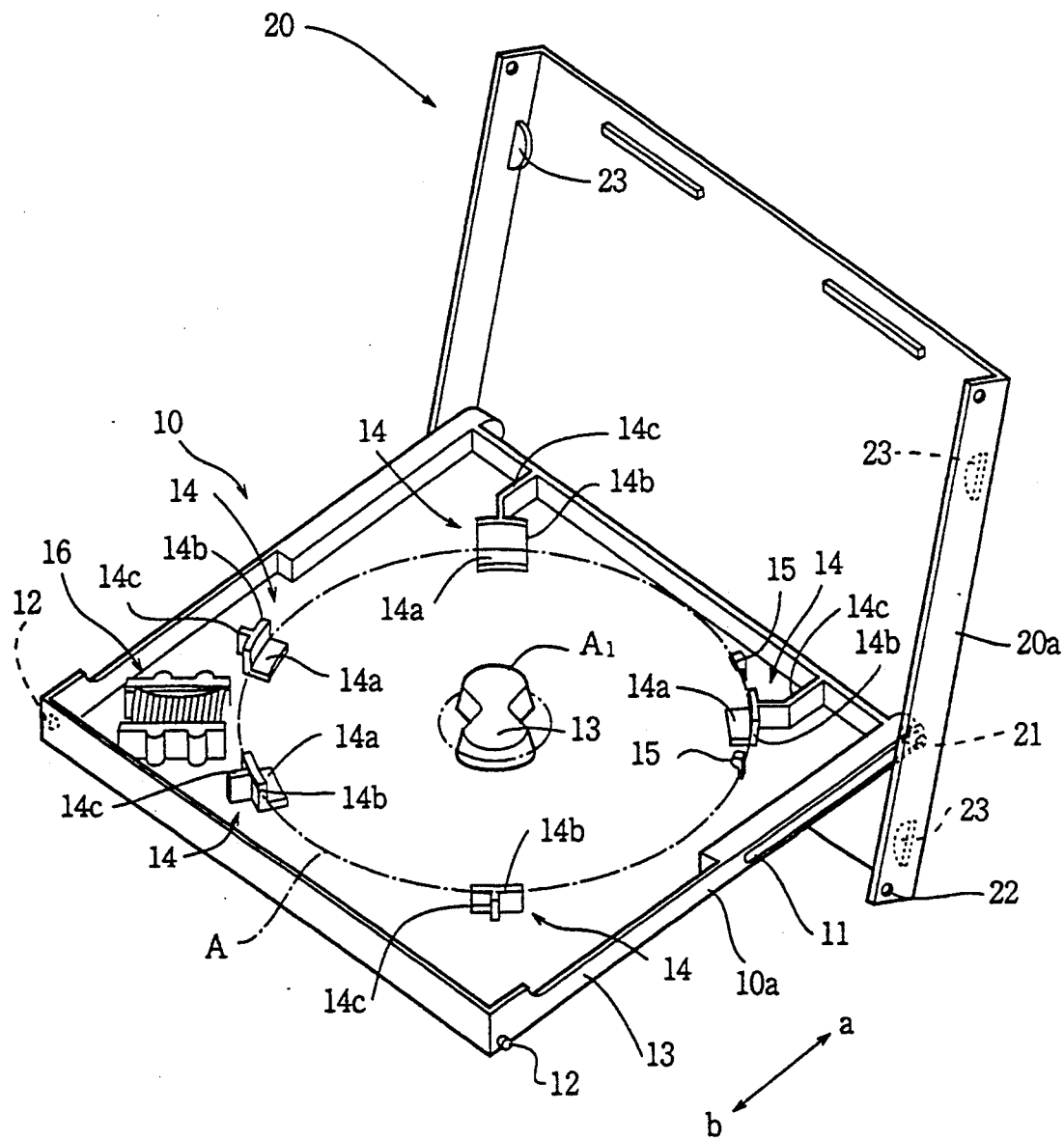
FIG. 7 is a perspective view showing another conventional disk case.
Figure 8:
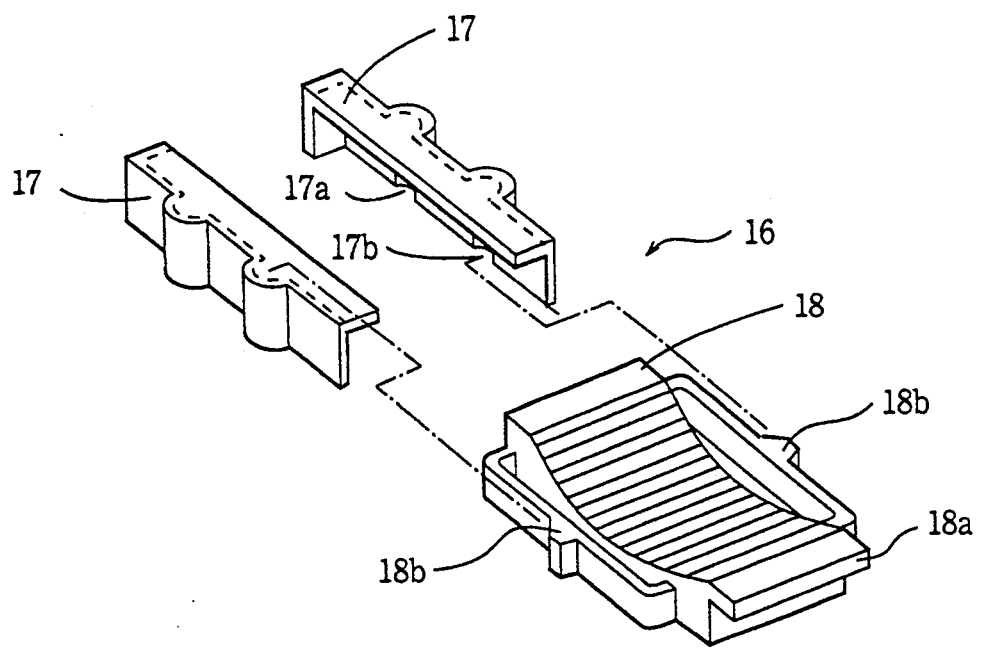
FIG. 8 is a perspective view showing a lock member of the conventional case of FIG. 7.

In this state, the ball-shaped projections 45 of the lugs 44 abut on the periphery of the disk A as shown in FIG. 5. Thus, the disk A is held in the case.

The spring plate 37 may be provided between the rear supporting members 36B.

In accordance with the present invention, the disk is mounted on the supporting members provided on the case body opposite to each other and positioned apart from the base plate of the case body. The spring is engaged with the disk to urge the disk to the supporting members provided opposite to the spring. Thus, the disk is prevented from moving in the horizontal direction. when closing the case, the disk is engaged with the ball-shaped projections provided on the resilient lugs of the cover. Thus, the disk is prevented from moving in the vertical direction. Consequently, the disk is exactly mounted in the disk case having the simple construction.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A case for an optical disk having a case body having a base plate, side plate and a front plate, and a cover, comprising:
    a plurality of supporting members provided on the base plate, wherein a peripheral portion of an optical disk in said case is mounted on the supporting members with a gap between the optical disk and the base plate;
    a spring provided in the case body for engaging a peripheral edge of the disk to urge the disk at least against supporting members opposite the spring, each of the plurality of supporting members having a support portion for supporting the disk and a bevel on which the disk is urged by the spring; and
    a pair of resilient lugs provided on the cover, each having a ball-shaped projection which is provided to be abutted on a peripheral portion of the optical disk to urge the disk to the supporting members when the cover is closed.

* * * * *

UNITED STATES PATENT AND TRADEMARK OFFICE
CERTIFICATE OF CORRECTION

PATENT NO. : 5,263,580
DATED : November 23, 1993
INVENTOR(S) : Yukiyoshi CHIBA et al It is certified that error appears in the above-indentified patent and that said Letters Patent is hereby corrected as shown below:

On the title page, Item [75], first line, change " Ciba " to -- CHIBA --.

Signed and Sealed this

Thirty-first Day of May, 1994

Attest:

BRUCE LEHMAN

*Attesting Officer*     *Commissioner of Patents and Trademarks*